UNITED STATES PATENT OFFICE.

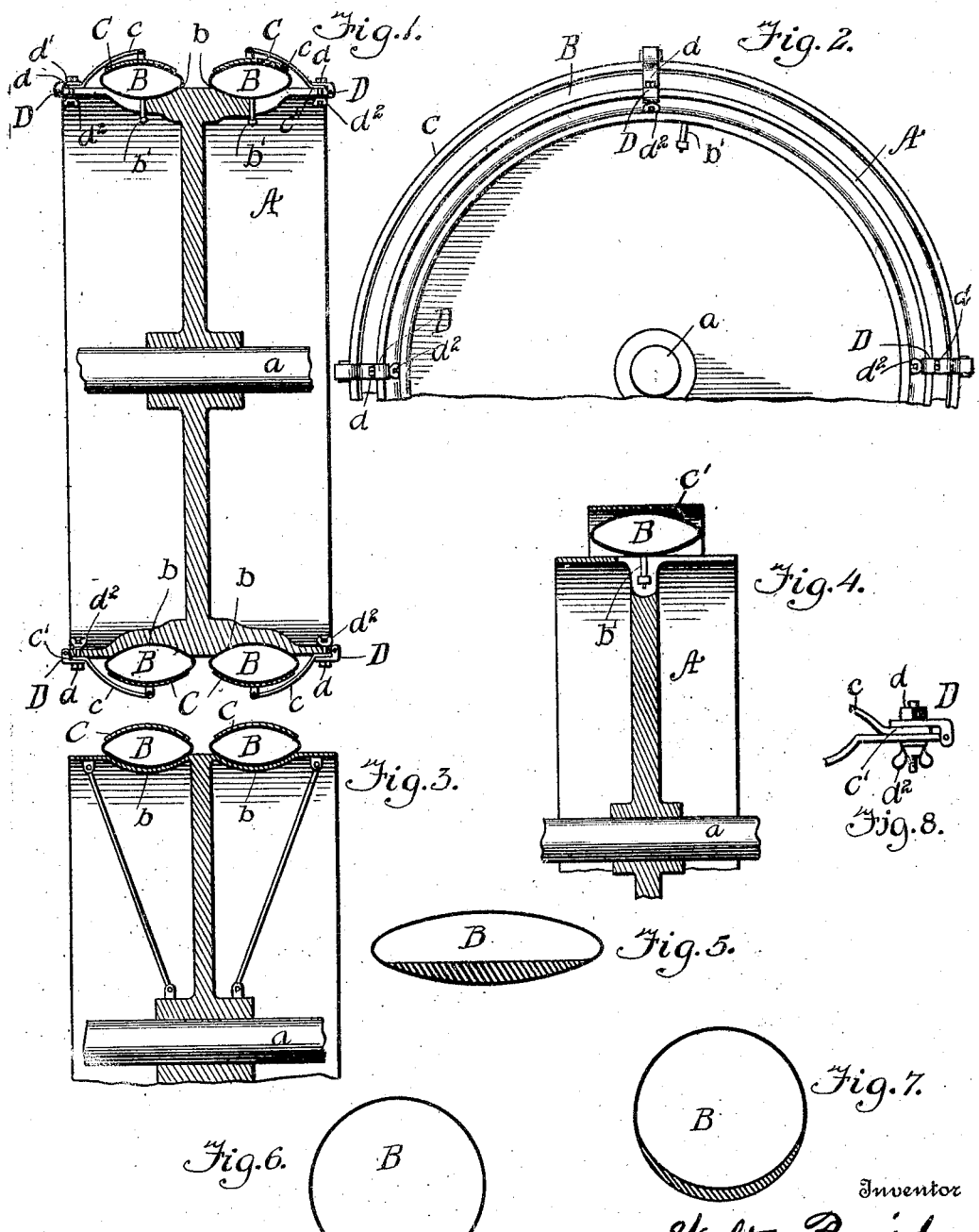

WALTER BAIRD, OF PITTSBURG, KANSAS.

PROCESS OF AND APPARATUS FOR LINING PNEUMATIC TIRES.

951,980.  Specification of Letters Patent.  Patented Mar. 15, 1910.

Application filed December 1, 1909. Serial No. 530,770.

*To all whom it may concern:*

Be it known that I, WALTER BAIRD, citizen of the United States, residing at Pittsburg, Kansas, have invented certain new and useful Improvements in Processes of and Apparatus for Lining Pneumatic Tires; and I do hereby declare the following to be a full, clear, and exact description of the invention, such as will enable others skilled in the art to which it appertains to make and use the same.

This invention relates to the art of lining pneumatic tires, and, in particular, to lining such tires with what is known as self-healing material or compounds, that is to say, elastic or other compounds which have the property of preventing the formation of punctures in pneumatic tires for automobiles or bicycles or, in case such punctures are formed during the use of the vehicle, of automatically closing the same and thereby "healing" the tire. These compounds may be in the form of a mixture which, after the same is applied to the interior of the tire in a liquid form, either solidifies to form an elastic armor preventing the formation of punctures which communicate with the interior of the tire, or forms a viscous or slow-drying coating which when a puncture is formed is forced into the same by the pressure within the tire and then dries by contact with the outer air, thereby plugging the puncture.

The object of the present invention is to provide a method and means whereby such puncture proofing or self-healing compounds, or, generally, lining mixtures, may be applied evenly to that part of the interior of the tire or inner tube forming part of such tire which is apt to be punctured and therefore needs protection.

Heretofore, according to one method of proceeding, such tire lining compounds have been introduced in a liquid form into the tire or inner tube, the said tire being then rotated in order to throw the self-healing composition against the inner portion of the outer periphery of the tire or inner tube, where it is intended to adhere either as a solid or as a semi-liquid or viscous coating. This method of applying the lining compound has the objection that the compound is very unevenly applied to the inner surface of the tire or inner tube, being very much thicker at the extreme periphery of the tire than at those portions which are nearer the center or axis of the tire when mounted on the wheel. Moreover, under the old methods of proceeding, the composition does not extend far enough toward the axis of the tire and the said composition is liable to become so thick near the outer portion as to unnecessarily encumber the interior of the said tire.

These objections are removed in proceeding under my invention which consists in flattening the tire or inner tube to be treated after the same has been inflated and the composition has been injected therein, and then rapidly revolving said tire.

My invention also consists in a rotary drum upon which the tire is mounted for the purpose of lining the same, said drum being combined with hoops or bands between which and the drum the tire is held in such a way as to be flattened while being rotated.

My invention also consists in such further features, arrangements and combinations of parts as will be hereinafter described and pointed in the claims.

In the accompanying drawings, Figure 1 represents a longitudinal central section of a tire lining apparatus embodying my invention; Fig. 2 an end view thereof; Fig. 3 represents a partial sectional view of a somewhat modified form of apparatus; Fig. 4 represents a similar view of another modification; and Figs. 5, 6 and 7 are diagrams illustrating the advantages of the invention.

Referring to these drawings, A represents a rotary support or drum and $a$ its axle or shaft. As shown, the drum A is provided with two annular grooves $b$, $b$, for receiving the tires or inner tubes B, B. The two rims or bands C, C, having a cross section similar to the cross section of the grooves $b$, $b$, are arranged concentrically with respect to said grooves, as shown. The position of the hoops or bands C with respect to the grooves $b$ and the form in cross section of these hoops and grooves $b$ are such as to flatten the tires or inner tubes B into an elliptical form as shown, when said tubes are inflated and mounted upon the drum and are held between the hoops C and the grooves $b$ of the said drum. The periphery of the drum A can be made of ordinary galvanized iron or sheet steel upon which the grooves $b$ can be very readily formed by well known methods. The hoops or bands C can also be very readily made of galvanized iron or sheet steel and arched transversely as shown in a manner well known in the manufacture of sheet iron and steel material.

As shown in Fig. 1, the hoops C are held upon the drum by arms or brackets c, which are clamped at the outer edges of the drum by the clamps D, each consisting of a clamp-jaw d hinged to the said outer edge and held down upon the lower lip c' of the arm or bracket c by means of the screw-bolt d' and thumb-nut $d^2$, in a manner which will be readily understood. These clamps are arranged at regular intervals on the edge of the drum and in the present instance I have shown them as arranged at 90° apart, that is, four of such clamps occupying each edge of the drum. This manner of securing the bands C in position is provided for holding the said bands against lateral motion with certainty. In may cases it, however, can be dispensed with and the form of apparatus shown in Fig. 3 employed. Under this construction it will be noted that the hoops C are simply placed over the tire or inner tube B loosely, the said bands C being held in place by the tire in a manner which will be readily understood. Under this construction the security against lateral displacement is not so great as in the device illustrated in Fig. 1. However, this manner of arranging the apparatus will be sufficient in many cases.

In some cases I may dispense with the grooves b and simply flatten the tire between a cylindrical surface of a rotary drum or wheel A' and a flat cylindrical hoop C'. This construction is illustrated in Fig. 4. Fig. 4 also differs from the preceding figures in that the same is arranged to receive only a single tire or inner tube.

The mode of operation of the apparatus so described is obvious from the foregoing. The elastic tire or inner tube to be lined is placed upon the drum A, as shown, so as to occupy one of the grooves b, as shown in Figs. 1 and 3, and the self-healing or other lining composition is introduced into the interior of said tire or inner tube through the valve stem b' or otherwise. The tire or inner tube is then inflated sufficiently to present no wrinkles or concavities on the exterior and the hoops C are then placed in position over the tire or inner tube, the said inner tube yielding sufficiently to allow the hoop to pass into proper position, but after the same has passed, offering sufficient resistance to hold it in place, the tire being flattened against the drum, as shown in Figs. 1 to 4.

Instead of introducing the composition or inflating the tire or tube after mounting the same on the drum, the composition may be introduced and the tire inflated before mounting the same on the drum, since the tire will in most cases be sufficiently elastic to yield to the necessary extent for this purpose. It is not absolutely necessary to fully inflate the tire for the reason that the pressure within the same will increase as the same is flattened. The hoop or band may then be further secured in position by the brackets c, and clamps D, as shown in Fig. 1, or the resistance of the tire may be relied upon to hold the said band in position as in Fig. 3. The drum A is then rapidly revolved, whereby the liquid lining composition is thrown to the outer portions of the inner periphery of the tire or inner tube so as to line said outer portion and to protect said outer portion which is the part of the tire liable to be punctured or pierced, thereby protecting it against such action.

In Fig. 5 I have shown diagrammatically the effect of this treatment on the tire. In this figure the portion e represents the coating of self-healing or other composition which has been applied to the inside of the tire or inner tube B when the tire was in its flattened position.

Fig. 7 represents the same tire or inner tube after the same has been released from its position between the drum A and the hoops C and has returned to its original circular cross section.

Fig. 6 shows a similar view of a tire or rim B' which has been lined without flattening the same as under my invention. A comparison of this figure with Fig. 7 will show the advantages of my method and apparatus over those heretofore employed, these advantages being mainly the more even distribution of the lining material and the greater amount of surface covered with the same amount of material. From a comparison of these two figures it will be apparent moreover, that under the present invention the interior of the tire or inner tube is encumbered to a minimum extent and is left more pliable than if the tire or inner tube were not flattened prior to rotating the same.

The cross section of the grooves b and of the hoops C, as represented in Figs. 1 and 3, is in the form of a flattened arc, that is to say, either an arc of an ellipse taken at the point where its radius of curvature is greatest, or an arc of a circle having a greater radius than the radius of the circular cross-section of the tire when in its normal unflattened condition. The first mentioned form of cross-section of the grooves and hoops is the one preferred since it produces a more even distribution of the lining composition.

In some cases I may use the vehicle wheel which carries the tire as the rotary support for the same in carrying out my invention, the tire being inflated only sufficiently to maintain the same distended, a hoop of sufficient diameter, as in Figs. 1 to 4, is then passed over the tire, so as to flatten the same against the wheel rim, that is to say, to maintain its cross-section as shown in said Figs. 1 to 4.

What I claim and desire to secure by Letters Patent, is:—

1. The method of lining a pneumatic tire or tube, which consists in introducing a lining composition within the tire, inflating and flattening the same, and then revolving the same in the plane of its periphery.

2. The method of lining a pneumatic tire or tube, which consists in flattening said tire or tube transversely to the plane of its periphery after the lining composition has been introduced therein and the same has been inflated, and then revolving said tire or tube.

3. The process of lining a pneumatic tire or tube, which consists in introducing the lining composition within said tire or tube and inflating the same, and maintaining said tire or tube in circular form while revolving and maintaining it flattened in cross section.

4. The process of lining a pneumatic tire or tube, which consists in introducing the lining composition within said tire or tube and inflating the same, mounting said tire or tube on a drum, flattening the same, and then revolving the drum.

5. An apparatus for lining pneumatic tires or tubes, which consists in a rotary support for the tire, in combination with means for maintaining the tire in a flattened condition on the rotary support.

6. An apparatus for lining pneumatic tires or tubes, which consists in a rotary drum, in combination with a hoop greater in diameter than the exterior periphery of the drum, and adapted to flatten the tire or tube upon the said drum.

7. An apparatus for lining pneumatic tires or tubes, which consists in a rotary drum, in combination with a hoop greater in diameter than the exterior periphery of the drum, and adapted to flatten the tire or tube upon the said drum, and means for securing said hoop against lateral displacement.

8. An apparatus for lining pneumatic tires or tubes, which consists in a rotary drum, in combination with a hoop greater in diameter than the exterior periphery of the drum, and adapted to flatten the tire or tube upon the said drum, and a clamp for securing said hoop on said drum.

9. An apparatus for lining pneumatic tires or tubes, which consists of a rotary drum having an annular peripheral groove therein for receiving the tire or rim, in combination with a transversely curved hoop or band, the hoop or band and the grooved drum being adapted to hold and flatten the tire or tube between them.

In testimony whereof I hereunto affix my signature in the presence of two witnesses.

WALTER BAIRD.

Witnesses:
E. O. HILDEBRAND,
HARRY F. RUETH.